United States Patent Office 3,188,200
Patented June 8, 1965

3,188,200
METHOD OF PURIFYING REFRACTORY METALS
James A. Brothers, Trenton, Mich., assignor to Wyandotte Chemicals Corporation, Wyandotte, Mich., a corporation of Michigan
No Drawing. Filed May 21, 1962, Ser. No. 196,489
13 Claims. (Cl. 75—84)

This invention relates to the purification of refractory metals. More particularly this invention relates to the removal of oxygen from refractory metals.

Commercial applications of niobium metal and other refractory metals in most instances require extreme purity. One of the most commonly found impurities in refractory metals such as niobium is oxygen. Small quantities of this impurity cause hardening and embrittlement of the metal resulting in metal that is difficult to fabricate.

In the most commonly employed methods for the production of niobium metal, niobium pentachloride or oxides of niobium are reduced to the pure metal. Generally, niobium pentachloride is reduced to the metal with hydrogen. One method of carrying out this reduction is disclosed by Gonser et al. in U.S. Patent 2,604,395. In the Gonser et al. method niobium pentachloride is reduced with hydrogen and deposited on a dissimilar metal base.

The above described reduction method produces niobium metal containing small quantities of oxygen impurity. Although precautions are taken to remove oxygen from both the niobium pentachloride and hydrogen gases, it is very difficult and expensive to reduce the oxygen concentration to the requisite low level. However, not only is oxygen introduced into the reduction apparatus with the gases but oxygen seeps into the reduction equipment from the atmosphere by way of leaks in the equipment. Therefore it is apparent that the elimination of oxygen from the system is a difficult problem to overcome.

In addition to the oxygen introduced into the niobium metal during its formation, oxygen is picked up when the metal is exposed to the atmosphere. This is a serious source of oxygen contamination. Fine particles of the niobium metal are particularly adversely affected due to the large surface area of the particles. Such particles are inherent in the production of niobium metal by the well-known fluidized bed method of reducing niobium pentachloride with hydrogen to niobium metal. While the elimination of oxygen from the system during the reduction of niobium pentachloride will eliminate one source of oxygen contamination, it will not eliminate oxygen contamination of the metal by the atmosphere. Therefore another approach to the problem of oxygen contamination of niobium metal is necessitated that will eliminate or reduce both the oxygen acquired during production and that acquired when the metal is exposed to the atmosphere. However, heretofore such a method to accomplish the foregoing result was unknown to the art.

Therefore an object of this invention is to provide a process for reducing the oxygen content of refractory metals.

Another object of this invention is to provide a process for reducing the oxygen content of refractory metals acquired during production.

A further object of this invention is to provide a process for reducing the oxygen content of refractory metals acquired during exposure to the atmosphere.

A still further object of this invention is the provision of refractory metals of low oxygen content that are easily fabricated.

The above and other objects, which will become readily apparent upon the reading of this specification, have been accomplished by the process of this invention.

The process of the present invention for the removal of oxygen from refractory metals consists of contacting in a heated reaction zone finely divided particles of refractory metal of the group consisting of niobium, molybdenum, tungsten, and vanadium with a mixture of hydrogen chloride and hydrogen, argon, or helium or mixtures thereof.

The treatment of refractory metals according to the foregoing process results in metals of extremely high purity. The oxygen concentration is reduced substantially, thus resulting in a refractory metal easily fabricated.

In carrying out the method of this invention it is required that the metal treated be a refractory metal having a volatile oxychloride. Accordingly, niobium, molybdenum, tungsten, and vanadium are examples of metals that may be purified by this method. It is obvious that the metal also must contain oxygen, which may have been picked up during production of the metal or during storage. Refractory metals upon exposure to the atmosphere tend to pick up oxygen.

It is desirable to have the refractory metal in a finely divided particle state. Such a physical state insures intimate contact of the particles with the gas mixture. In general a particle size range of —60 to +325 mesh (U.S.) is adequate while a preferred range is —80 to +200 mesh (U.S.). The term "mesh" as used throughout the description of the invention and claims refers to sieve numbers of the U.S. Sieve Series. Accordingly, a 60-mesh sieve has a 0.25 mm. opening, an 80-mesh a 0.177 mm. opening, a 200-mesh a 0.074 mm. opening and a 325-mesh a 0.044 mm. opening. Extremely fine metal powder tends to plug up the equipment and therefore should be avoided. The particle size of products obtained from the fluidized bed reduction of niobium pentachloride is generally within the recommended range.

In the purification method of this invention a refractory metal is contacted with a mixture of gases. One gas contained in the mixture is hydrogen chloride. Actually hydrogen chloride itself will reduce the oxygen contamination of the metal; however, due to the reactivity of hydrogen chloride with refractory metals a portion of the pure metal would be chlorinated and volatilized. Therefore, to prevent or reduce metal chlorination, an inert gas such as argon or helium, or a mixture of these gases, is employed as a hydrogen chloride diluent. Preferably, however, in place of or included with the inert gas a reducing gas such as hydrogen is employed. Hydrogen, having the tendency to drive the metal chlorination reaction in the opposite direction, tends to neutralize the effect of hydrogen chloride on the pure refractory metal. Thus the inclusion of hydrogen in the gas stream with hydrogen chloride results in a controlled oxygen removal process which keeps the loss of refractory metal via the metal chloride reaction to a minimum.

The relative concentration of each gas in the gas mixture has an important effect on the metal loss. Accordingly hydrogen chloride should constitute about 5 to about 75% of the total volume of the gases utilized and preferably about 10 to about 25% by volume to insure adequate oxygen removal with minimum metal loss. Higher hydrogen chloride concentrations result in excessive pure refractory metal losses, while low concentrations increase reaction time.

In carrying out the method of this invention the oxygen-contaminated refractory metal particles may be static or dynamic during contiguity of the metal particles with the hydrogen chloride-containing gas. Thus it is apparent that any one of a number of pieces of apparatus may be utilized to accomplish the result of this invention.

Accordingly, a fluidized bed reactor has been found convenient for carrying out this process. Finely divided oxygen-containing particles of refractory metal are fluidized with the hydrogen chloride-containing gas stream. It is particularly important when operating a fluidized bed reactor that the metal particles be greater than 325 mesh to prevent loss of particles from the system. However the purification of refractory metals has also been successfully attained in a packed tower containing a static bed of metal. In this type of apparatus the hydrogen chloride-containing gas is passed through a tower packed with the refractory metal. Such operations as presented in the foregoing lend themselves to both batch and continuous operation.

In addition to the fluidized bed and packed tower reactors, it is convenient to carry out the process in a rotary drum or stationary drum type reactor. The hydrogen chloride-containing gas is passed through the moving particles in a rotary drum reactor or over the metal particle bed in the stationary type reactor and thereby allowing the gas to diffuse between the particles, thus effectuating the removal of oxygen from the metal.

Another convenient manner in which to carry out the process of this invention is to pass the hydrogen chloride-containing gas through a tube containing refractory metal particles dispersed in quartz wool. Such a method insures intimate contact of the gas with the refractory metal.

However, regardless of which type reactor is utilized the reaction zone of the reactor is at a temperature of about 350 to 1000° C. In the preferred embodiment of this invention the temperature range is from about 450 to 850° C. Temperatures in the vicinity of 800° C are especially convenient in that with hydrogen present in the gas mixture the equilibrium of the refractory metal chlorination reaction is driven in the opposite direction to the pure metal. Hence, little refractory metal chloride is lost from the system.

To insure that the required reaction temperature is maintained in the reaction zone it will be necessary that the particular reactor utilized be equipped with some type of heating means. A furnace or electrical heating means attached externally to the apparatus is convenient for this purpose.

Whether or not the gases should be preheated to the reaction temperature is dependent upon the type of apparatus utilized. In the case of a static bed of refractory metal particles it is recommended that the gas be heated to the reaction temperature; however, in the case of a dynamic bed, such as a fluidized bed, preheating of the gas is not necessary to maintain the requisite reaction zone temperature.

Almost immediately upon the commencement of the hydrogen chloride-containing gas flow and the contacting of the oxygen-contaminated refractory metal a white fume commences to emit from the metal. The reaction is carried out until the white fume stops at which time it has been found that the oxygen in the refractory metal has been reduced to a low level. For example, niobium metal after treatment has been found to contain only one-tenth of the oxygen in the original nontreated metal.

It should be understood that the individual gases may be introduced separately into the reactor with the mixing of the gases occurring in the reactor or they may be introduced into the reactor as a mixture.

In accordance with the process of this invention a refractory metal of high purity is produced having low oxygen content. The mechanism of the invention is unknown, and therefore the chemical composition in which the remaining oxygen is contained in the metal is unknown. Thus the refractory metal product from the process of this invention can only be described by the method by which the oxygen-contaminated refractory metal starting material is treated.

The following examples are presented to particularly illustrate the invention but should not be used to limit, unduly, the scope of the invention.

*Example 1*

About 25 grams of niobium metal powder having a particle size of —200 mesh were dispersed in quartz wool and loaded into a 1-inch O.D. quartz tube. The quartz wool and metal powder occupied about 7 inches of the central portion of the heating zone in a 1-inch I.D. furnace 12 inches in length. The over-all length of the quartz tube was 4 feet. After purging the quartz tube with argon, the temperature of the furnace was adjusted to 500° C. in a hydrogen atmosphere. Hydrogen and hydrogen chloride were introduced into the tube at flow rates of 750 cc. per minute and 75 cc. per minute, respectively. A white dust or fume appeared at the exit end of the tube almost immediately and continued for 2½ hours after which time the dust stopped. The gas flow was terminated at this time.

The oxygen content of the niobium metal powder at the start of the run was 0.3 weight percent. Analysis of the niobium metal powder after the run showed an oxygen content of 0.04 weight percent.

*Example 2*

About 25 grams of niobium metal powder having a particle size of —200 mesh were loaded into a quartz tube as described in Example 1. At 800° C. with hydrogen flowing through the bed of niobium metal at the rate of 750 cc. per minute, hydrogen chloride was fed into the tube at the rate of 75 cc. per minute. A white dust or fume appeared in the exit section of the tube and continued for 1½ hours. The gas flow was then stopped. The niobium metal powder, which contained 0.3 weight percent oxygen at the start of the run, was analyzed and found to contain 0.03 weight percent oxygen after the run.

It should be apparent from the foregoing that a novel process of reducing the oxygen contamination of refractory metals has been discovered. The resulting product of the process is characterized by its extremely low oxygen content. Thus the process of this invention results in purified refractory metal particles which are easily fabricated.

While this invention has been described and exemplified in terms of its preferred embodiment those skilled in the art will appreciate that modifications can be made without departing from the spirit and scope of this invention.

I claim:

1. A process for the purification of oxygen-contaminated refractory metals which comprises contacting finely divided particles of an oxygen-contaminated refractory metal selected from the group consisting of niobium, molybdenum, tungsten, and vanadium with a mixture of hydrogen chloride gas and a gas selected from the group consisting of hydrogen, argon, and helium, and mixtures thereof in a reated reaction zone.

2. The process according to claim 1 wherein said refractory metal is niobium and said mixture is hydrogen chloride gas and hydrogen.

3. The process according to claim 1 wherein said refractory metal is niobium and said mixture is hydrogen chloride gas and argon.

4. A process for the purification of oxygen-contaminated refractory metals which comprises contacting finely divided particles of an oxygen-contaminated refractory metal selected from the group consisting of niobium, molybdenum, tungsten, and vanadium with a mixture of hydrogen chloride gas and a gas selected from the group consisting of hydrogen, argon, and helium, and mixtures thereof in a heated reaction zone wherein the temperature in said reaction zone is from about 350 to 1000° C.

5. The process according to claim 4 wherein said refractory metal is niobium and said mixture is hydrogen chloride gas and hydrogen.

6. The process according to claim 4 wherein said refractory metal is niobium and said mixture is hydrogen chloride gas and argon.

7. A process for the purification of oxygen-contaminated refractory metals which comprises contacting finely divided particles of an oxygen-contaminated refractory metal selected from the group consisting of niobium, molybdenum, tungsten, and vanadium with a mixture of hydrogen chloride gas and a gas selected from the group consisting of hydrogen, argon, and helium, and mixtures thereof in a heated reaction zone, wherein said metal is of a particle size range such that the metal particles will pass through a 60-mesh screen and be retained on a 325-mesh screen.

8. A process for the purification of oxygen-contaminated refractory metals which comprises contacting finely divided particles of an oxygen-contaminated refractory metal selected from the group consisting of niobium, molybdenum, tungsten, and vanadium with a mixture of hydrogen chloride gas and a gas selected from the group consisting of hydrogen, argon, and helium, and mixtures thereof in a heated reaction zone, wherein said hydrogen chloride constitutes from about 5 to 75% by volume of said mixture.

9. The process according to claim 8 wherein said refractory metal is niobium and said mixture is hydrogen chloride gas and hydrogen.

10. The process according to claim 8 wherein said refractory metal is niobium and said mixture is hydrogen chloride gas and argon.

11. A process for the purification of oxygen-contaminated refractory metals which comprises contacting finely divided particles of an oxygen-contaminated refractory metal selected from the group consisting of niobium, molybdenum, tungsten, and vanadium with a mixture of hydrogen chloride gas and a gas selected from the group consisting of hydrogen, argon, and helium, and mixtures thereof in a heated reaction zone, wherein said metal is of a particle size range such that the metal particles will pass through a 60-mesh screen and be retained on a 325-mesh screen, wherein said hydrogen chloride gas constitutes from about 5 to 75% by volume of said mixture, and wherein the temperature in said reaction zone is from about 350 to 1000° C.

12. The process according to claim 11 wherein said refractory metal is niobium and said mixture is hydrogen chloride gas and hydrogen.

13. The process according to claim 11 wherein said refractory metal is niobium and said mixture is hydrogen chloride gas and argon.

References Cited by the Examiner

UNITED STATES PATENTS

| | | | |
|---|---|---|---|
| 2,675,310 | 4/54 | Hall | 75—224 |
| 2,761,776 | 9/56 | Bichowsky | 75—84 |
| 2,766,117 | 10/56 | Crowley et al. | 75—224 |
| 2,811,433 | 10/57 | Whitehouse et al. | 75—224 |
| 2,834,667 | 5/58 | Rostron | 75—84 |
| 2,922,710 | 1/60 | Dombrowski et al. | 75—84 |
| 3,012,876 | 12/61 | Eaton et al. | 75—84 |

CARL D. QUARFORTH, *Primary Examiner.*

OSCAR R. VERTIZ, REUBEN EPSTEIN, *Examiners.*